W. P. FLINT.
GAS ENGINE EXHAUST VALVE WATER CONNECTION.
APPLICATION FILED JAN. 14, 1910.
971,881.
Patented Oct. 4, 1910.
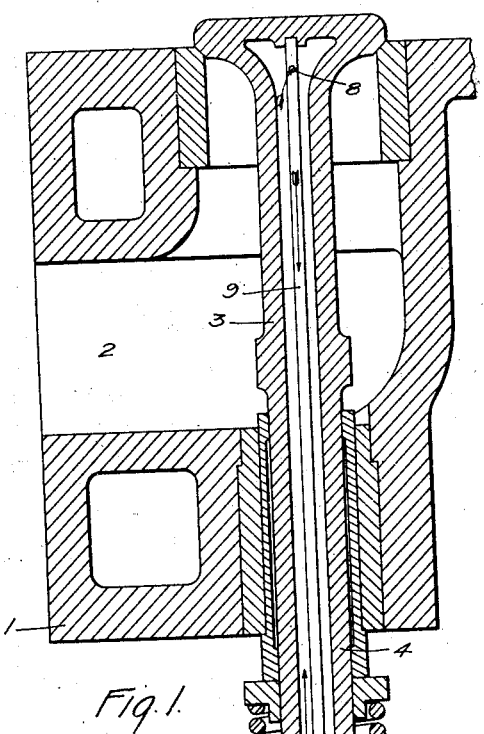
Fig. 1.
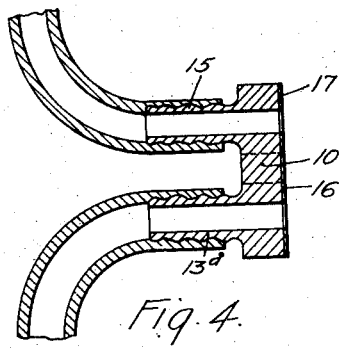
Fig. 4.
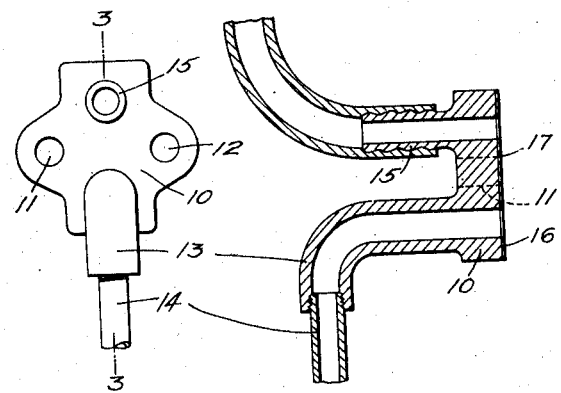
Fig. 2.   Fig. 3.
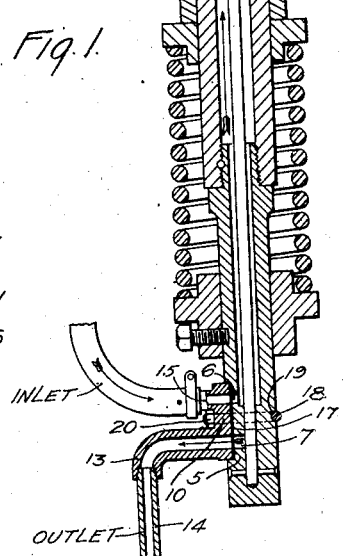
WITNESSES:
INVENTOR.
W. P. Flint
BY
HIS ATTORNEY IN FACT.

UNITED STATES PATENT OFFICE.

WILLIAM P. FLINT, OF PITTSBURG, PENNSYLVANIA, ASSIGNOR TO THE WESTINGHOUSE MACHINE COMPANY, A CORPORATION OF PENNSYLVANIA.

GAS-ENGINE-EXHAUST-VALVE WATER CONNECTION.

971,881. Specification of Letters Patent. Patented Oct. 4, 1910.

Application filed January 14, 1910. Serial No. 538,023.

*To all whom it may concern:*

Be it known that I, WILLIAM P. FLINT, a citizen of the United States, and a resident of Pittsburg, in the county of Allegheny and State of Pennsylvania, have made a new and useful Invention in Gas-Engine-Exhaust-Valve Water Connections, of which the following is a specification.

This invention relates to a connection for conduits but particularly to a water connection for moving parts of a gas engine. For example; it is often good practice to water cool the exhaust valve of an explosive motor. This is usually accomplished by introducing a flow of water through an opening in the stem of the valve from which it passes up through a conduit to the valve head and back through a pipe within the conduit to an outlet in the stem.

Some means is necessary for connecting an inlet supply pipe and an outlet pipe to the stem of the exhaust valve, and heretofore it has generally been the plan to screw an inlet connection into one threaded opening in the stem and to screw an outlet connection into another similar opening. In view of the fact that these connections were usually in the form of nipples and that they had to be unscrewed each time the valve had to be removed to be ground or for any other cause, the connection soon began to leak resulting in inconvenience and annoyance.

I have devised a connection which may readily be applied and removed from the stem and which consists of a few parts and which will not leak.

In the drawings, Figure 1 is a vertical longitudinal sectional view through a portion of an explosion motor and an exhaust valve to which my invention is applied. Fig. 2 is a face view of a connection constructed in accordance with my invention. Fig. 3 is a sectional view on the line 3—3 of Fig. 2 and Fig. 4 is a sectional view through a slightly modified form.

Referring now to the drawings by numerals of reference 1 designates a gas engine casing having the usual exhaust port 2 and in which works a reciprocatory exhaust valve 3 provided with a longitudinally hollow stem 4. The exhaust valve is illustrated as provided with the usual accessories which need not be mentioned here.

At a suitable place upon the stem 4 of the valve 3 I provide a flat seating face 5 in which are the inlet opening 6 and the outlet opening 7. The inlet opening 6 communicates with the interior of the stem to admit a cooling liquid thereinto, which cooling liquid may exhaust into the opening 8 in the pipe 9 and find its way through the opening 7. As it is desired to introduce a liquid from a convenient point distant from the stem and exhaust it to some suitable point distant from the stem, I have provided the connection, one form of which is shown in Figs. 1, 2 and 3. This form may consist of a flat plate 10 having bolt openings 11 and 12. From the face of the plate 10 extends a nipple 15 which is the inlet port and which receives supply from a suitable pipe. A nipple 13 registers with the exhaust port 7 in the stem 4, said nipple 13 being connected to a pipe 14 which may be of sufficient length to extend into a drain cup (not shown). The plate 10 is provided with a flat face 16 between which and the face 5 of the stem 4 may be placed a gasket or packing piece 17.

18 is a U-bolt which is adapted to fit in a groove 19 in the stem and have its two arms extend through openings 11 and 12 to receive nuts on its respective threaded ends, whereby by screwing up the nuts 20 the plate 10 may be drawn against the face 5 and a tightly packed joint result. If it is necessary to remove the connection for any cause all that will be required is to loosen the nuts 20, slide off the U-bolt and the connection may be removed. The nipples 13 and 15 on the plate shown in Fig. 4 are arranged to receive the ends of flexible pipes, as for example the construction shown in Fig. 4 which is the same as that shown in Figs. 1, 2 and 3 except the lower nipple 13ᵃ is designed for a rubber hose which may connect to a fixed drain pipe.

The flat face on the valve stem should preferably be made the same height as the part of the fitting which clamps against it so as to provide a shoulder which will aid the U-bolt 18 in retaining the connection in the exact position desired.

What I claim and desire to secure by Letters Patent is:

1. In combination with an exhaust valve having a flat seating face with liquid openings therein, of a tubular connection communicating with the liquid openings and having a flat seating face corresponding to the flat face on the valve, and means for securing these faces together.

2. The combination with a movable part to be water cooled, said part having a perforated flat seating face, a perforated plate having a pipe connecting nipple with which a perforation in the plate communicates, and a U-bolt for securing said plate to said movable part.

3. The combination with a hollow member having inlet and outlet ports, a flat seated plate having ports coinciding with inlet and outlet ports in the hollow member and provided with nipples surrounding said second mentioned ports, a gasket between said plate and said hollow member and means for securing said plate to said hollow member.

In testimony whereof, I have hereunto subscribed my name this 12th day of January, 1910.

WILLIAM P. FLINT.

Witnesses:
B. F. FUNK,
C. W. McGHEE.